US012709662B2

(12) United States Patent
Kim et al.

(10) Patent No.: US 12,709,662 B2
(45) Date of Patent: Aug. 18, 2026

(54) POLYIMIDE PRECURSOR PREPARED BY USING POLYCYCLIC MONOMER INCLUDING TRIFLUOROMETHYL GROUP AND FLEXIBLE POLYIMIDE OBTAINED BY USING THE SAME

(71) Applicant: KOREA ADVANCED INSTITUTE OF SCIENCE AND TECHNOLOGY, Yuseong-gu (KR)

(72) Inventors: Sang-Youl Kim, Yuseong-gu (KR); Seong-Jong Kim, Yuseong-gu (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 817 days.

(21) Appl. No.: 18/154,057

(22) Filed: Jan. 13, 2023

(65) Prior Publication Data

US 2023/0220161 A1 Jul. 13, 2023

(30) Foreign Application Priority Data

Jan. 13, 2022 (KR) ........................ 10-2022-0005258

(51) Int. Cl.
*C08G 73/10* (2006.01)
*C08J 5/18* (2006.01)

(52) U.S. Cl.
CPC ..... *C08G 73/1042* (2013.01); *C08G 73/1032* (2013.01); *C08G 73/1071* (2013.01); *C08J 5/18* (2013.01); *C08J 2379/08* (2013.01)

(58) Field of Classification Search
CPC .............. C08G 73/1039; C08G 73/104; C08G 73/1071; C08J 5/18
See application file for complete search history.

(56) References Cited

U.S. PATENT DOCUMENTS 5,260,408 A 11/1993 Auman

FOREIGN PATENT DOCUMENTS

CN 110317339 A 10/2019
KR 10-2010-0126427 A 12/2010

*Primary Examiner* — Gregory Listvoyb
(74) *Attorney, Agent, or Firm* — Shih IP Law Group, PLLC.

(57) ABSTRACT

The present disclosure relates to a polyimide precursor and flexible polyimide obtained by imidization of the polyimide precursor and having high transparency, high glass transition temperature and low coefficient of thermal expansion.

10 Claims, 3 Drawing Sheets

【FIG. 1】
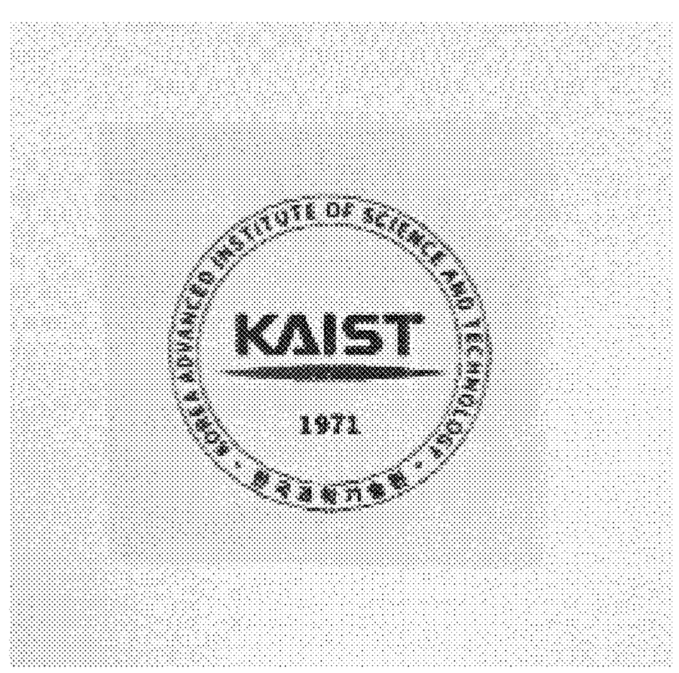
【FIG. 2】
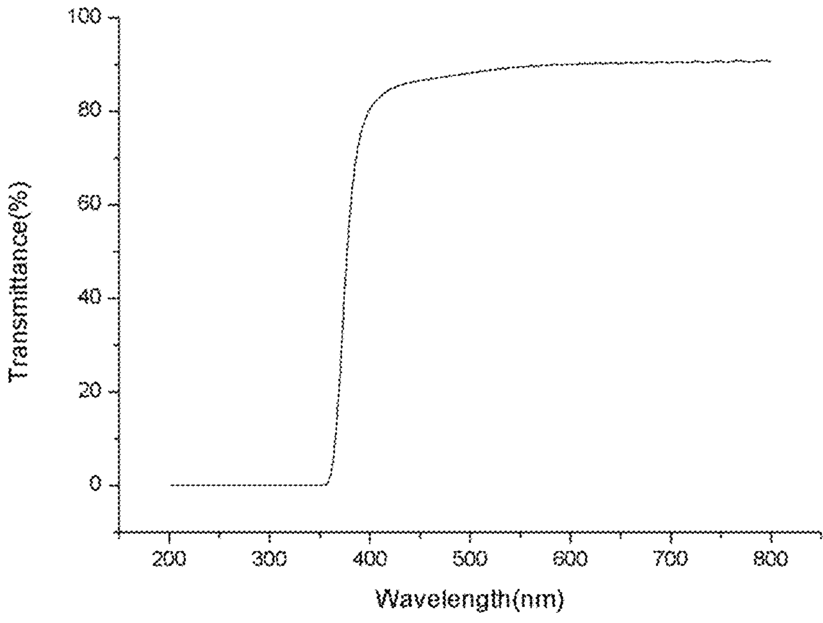

【FIG. 3】
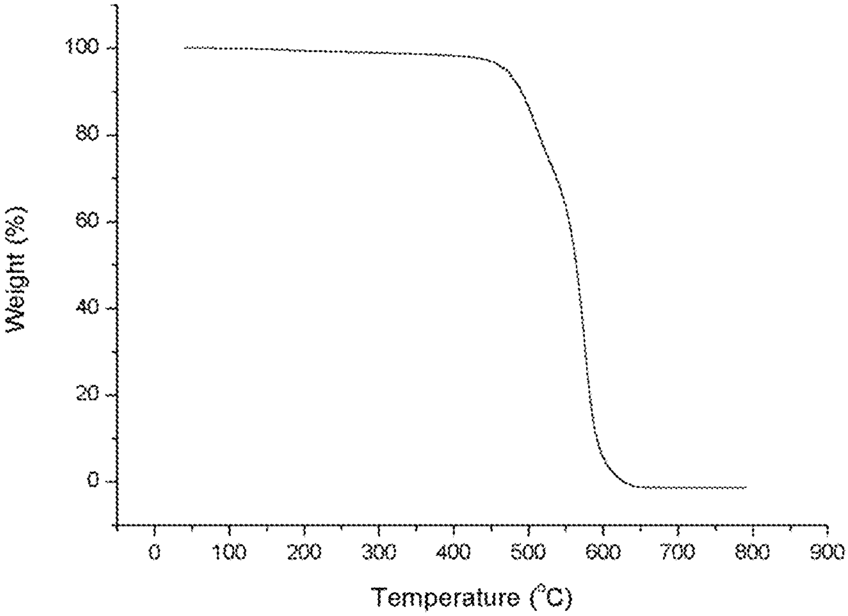
【FIG. 4】
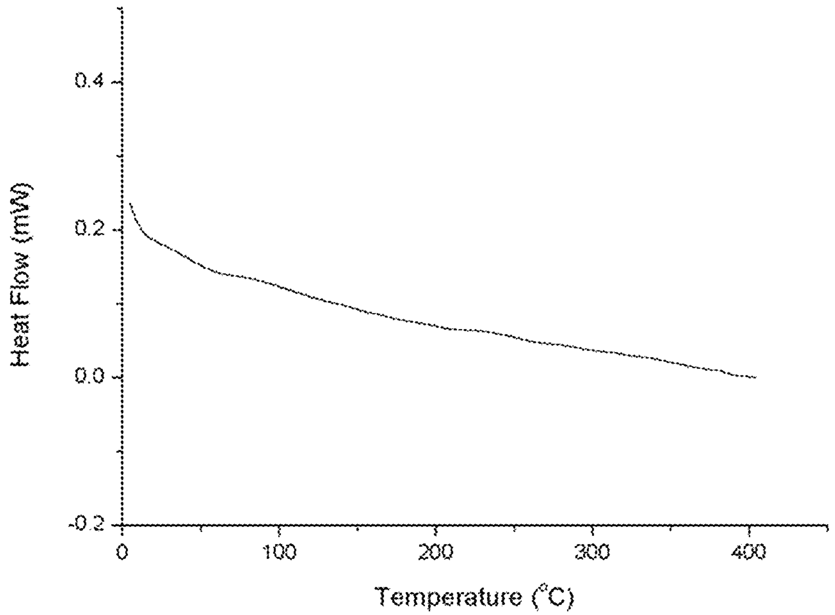

【FIG. 5】
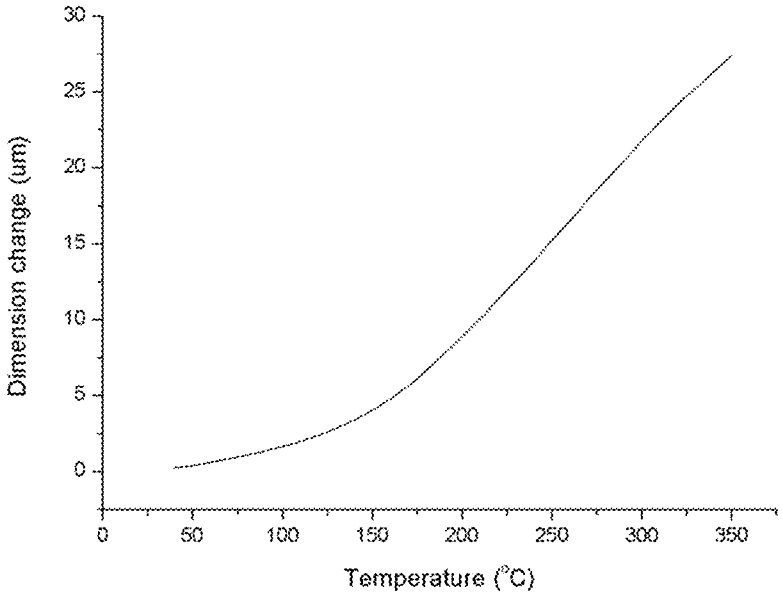
【FIG. 6】
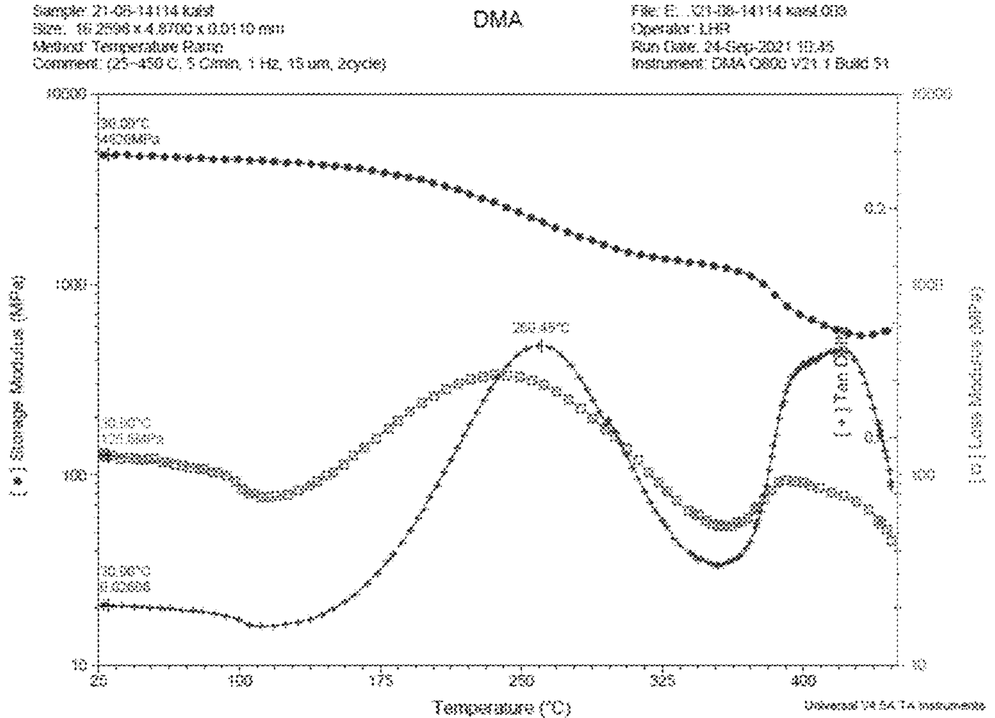

POLYIMIDE PRECURSOR PREPARED BY USING POLYCYCLIC MONOMER INCLUDING TRIFLUOROMETHYL GROUP AND FLEXIBLE POLYIMIDE OBTAINED BY USING THE SAME

CROSS-REFERENCE TO RELATED APPLICATION

This application claims the benefit under 35 USC 119(a) of Korean Patent Applications No. 10-2022-0005258 filed on Jan. 13, 2022 in the Korean Intellectual Property Office, the entire disclosures of which are incorporated herein by reference for all purposes.

TECHNICAL FIELD

The present disclosure relates to a polyimide precursor and flexible polyimide obtained by imidization of the polyimide precursor and having high transparency, high glass transition temperature and low coefficient of thermal expansion.

BACKGROUND

The display industry has grown steadily for about the past 20 years and its export scale amounted to 10 billion dollars in 2006. The display industry is expected to continuously grow due to a worldwide increase in demand for electronic devices, TV panels and smartphones.

A flexible display applicable to various fields has received a lot of attention as a next-generation display industry. The flexible display is light and unbreakable and is not limited in shape and size. Thus, it can be manufactured in various designs. Also, it is excellent in portability and thus can replace conventional flat panel displays. In order to replace glass, which has conventionally been used for a substrate and a cover window, with a polymer, physical, thermal and optical properties similar to those of glass are required of a polymer used for the flexible display. When a flexible display is manufactured using a polymer, there must be no degeneration of a substrate during a high-temperature process in which a thin film transistor or an organic layer is laminated on the substrate. Also, to minimize the difference between expansion and contraction of heterogeneous materials caused by heat generated during an operation of an element, a coefficient of thermal expansion equivalent to that of an inorganic material as well as a glass transition temperature of at least 400° C. is required.

PRIOR ART DOCUMENT

Korean Patent Laid-open Publication No. 10-2010-0126427.

DISCLOSURE OF THE INVENTION

Problems to be Solved by the Invention

The present disclosure provides a polyimide precursor and flexible polyimide obtained by imidization of the polyimide precursor and having high transparency, high glass transition temperature and low coefficient of thermal expansion.

However, problems to be solved by the present disclosure are not limited to the above-described problems. Although not described herein, other problems to be solved by the present disclosure can be clearly understood by a person with ordinary skill in the art from the following description.

Means for Solving the Problems

A first aspect of the present disclosure provides a polyimide precursor compound represented by the following Chemical Formula I:

[Chemical Formula I]

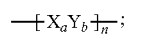

in the above Chemical Formula I, X is a combination of a dianhydride monomer represented by the following Chemical Formula 1 and a diamine monomer represented by the following Chemical Formula 2, Y is a combination of a dianhydride monomer represented by the following Chemical Formula 3 and the diamine monomer represented by the following Chemical Formula 2, a is an integer of 1 to 1,000; b is an integer of 1 to 1,000; n is an integer of 1 to 50,000,

[Chemical Formula 1]

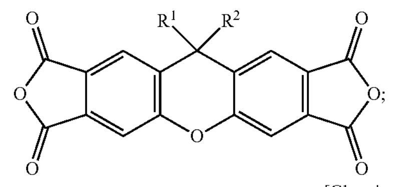

[Chemical Formula 2]

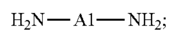

[Chemical Formula 3]

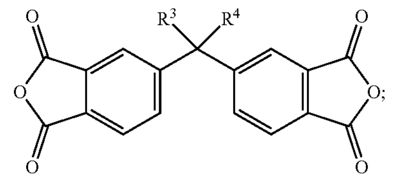

in the above Chemical Formula 1, Chemical Formula 2 and Chemical Formula 3, each of $R^1$ to $R^4$ is independently H, —$CF_3$, a substituted or unsubstituted linear or branched $C_{1-20}$ alkyl group, a substituted or unsubstituted $C_{6-20}$ aryl group, a substituted or unsubstituted $C_{4-20}$ heteroaryl group containing at least one hetero atom(s) from N, O and S, at least one of $R^1$ and $R^2$ is —$CF_3$, or the alkyl group, aryl group or heteroaryl group substituted with —$CF_3$, at least one of $R^3$ and $R^4$ is —$CF_3$, or the alkyl group, aryl group or heteroaryl group substituted with —$CF_3$, A1 is represented by the following Chemical Formula 4 or Chemical Formula 5,

[Chemical Formula 4]

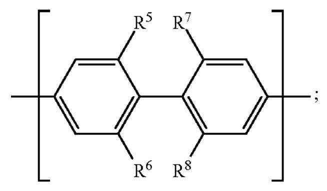

-continued

[Chemical Formula 5]

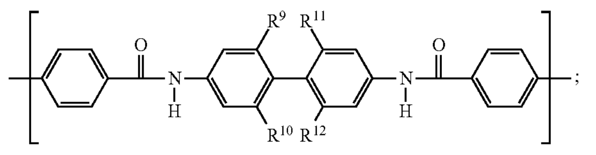

in the above Chemical Formula 4 and Chemical Formula 5, each of $R^5$ to $R^8$ or $R^9$ to $R^{12}$ is independently H, —$CF_3$, a substituted or unsubstituted linear or branched $C_{1-20}$ alkyl group, a substituted or unsubstituted $C_{6-20}$ aryl group, a substituted or unsubstituted $C_{4-20}$ heteroaryl group containing at least one hetero atom(s) from N, O and S, and at least one of $R^5$ to $R^8$, or at least one of $R^9$ to $R^{12}$ is —$CF_3$, or the alkyl group, aryl group or heteroaryl group substituted with —$CF_3$.

A second aspect of the present disclosure provides a polyimide, obtained by dehydration of a polyimide precursor according to the first aspect of the present disclosure and represented by the following Chemical Formula II:

[Chemical Formula II]

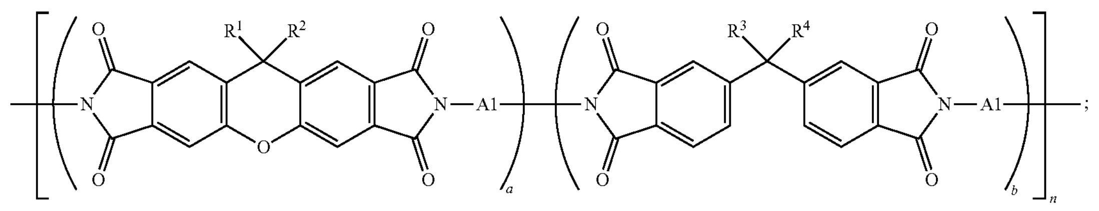

in the above Chemical Formula II, a is an integer of 1 to 1,000; b is an integer of 1 to 1,000; n is an integer of 1 to 50,000, each of $R^1$ to $R^4$ is independently H, —$CF_3$, a substituted or unsubstituted linear or branched $C_{1-20}$ alkyl group, a substituted or unsubstituted $C_{6-20}$ aryl group, a substituted or unsubstituted $C_{4-20}$ heteroaryl group containing at least one hetero atom(s) from N, O and S, at least one of $R^1$ and $R^2$ is —$CF_3$, or the alkyl group, aryl group or heteroaryl group substituted with —$CF_3$, at least one of $R^3$ and $R^4$ is —$CF_3$, or the alkyl group, aryl group or heteroaryl group substituted with —$CF_3$, A1 is represented by the following Chemical Formula 4 or Chemical Formula 5,

[Chemical Formula 4]

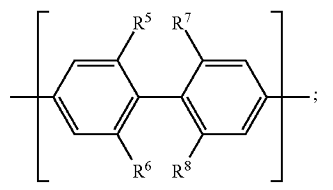

[Chemical Formula 5]

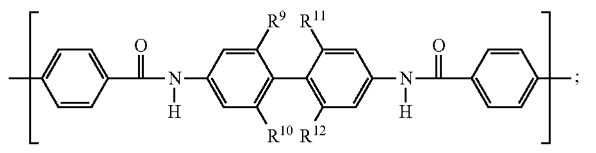

in the above Chemical Formula 4 and Chemical Formula 5, each of $R^5$ to $R^8$ or $R^9$ to $R^{12}$ is independently H, —$CF_3$, a substituted or unsubstituted linear or branched $C_{1-20}$ alkyl group, a substituted or unsubstituted $C_{6-20}$ aryl group, a substituted or unsubstituted $C_{4-20}$ heteroaryl group containing at least one hetero atom(s) from N, O and S, and at least one of $R^5$ to $R^8$, or at least one of $R^9$ to $R^{12}$ is —$CF_3$, or the alkyl group, aryl group or heteroaryl group substituted with —$CF_3$.

A third aspect of the present disclosure provides a film including the polyimide according to the second aspect of the present disclosure.

Effects of the Invention

Polyimide according to embodiments of the present disclosure may be obtained in the form of a film having thermal resistance, transparency and flexibility.

A film including polyimide according to embodiments of the present disclosure may possess a yellow index of about 6 or less, a glass transition temperature of about at least 400° C. and a coefficient of thermal expansion of about 20 ppm/° C. or less. Accordingly, it is possible to minimize the difference between expansion and contraction of heterogeneous materials caused by heat generated during an operation of an element including the film.

The film including polyimide according to embodiments of the present disclosure may exhibit properties equivalent to those of an inorganic material used for a TFT element.

The polyimide according to embodiments of the present disclosure may be used for a substrate of a transparent display, a cover window and a flexible electronic device.

BRIEF DESCRIPTION OF THE DRAWINGS

FIG. 1 is a photograph of a polyimide film prepared according to Example 1 of the present disclosure.

FIG. 2 is a graph of transmittance in the UV-visible region for the polyimide film prepared according to Example 1 of the present disclosure.

FIG. 3 is a graph of thermogravimetric analysis in air for the polyimide film prepared according to Example 1 of the present disclosure.

FIG. 4 is a graph of differential scanning calorimetry analysis of the polyimide film prepared according to Example 1 of the present disclosure.

FIG. 5 is a graph of thermomechanical analysis of the polyimide film prepared according to Example 1 of the present disclosure.

FIG. 6 is a graph of dynamic mechanical analysis of the polyimide film prepared according to Example 1 of the present disclosure.

DETAILED DESCRIPTION

Hereinafter, embodiments and examples of the present disclosure will be described in detail with reference to the accompanying drawings so that the present disclosure may be readily implemented by those skilled in the art. However, it is to be noted that the present disclosure is not limited to the examples but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element.

Through the whole document, the term "on" that is used to designate a position of one element with respect to another element includes both a case that the one element is adjacent to the other element and a case that any other element exists between these two elements.

Through the whole document, the term "comprises or includes" and/or "comprising or including" used in the document means that one or more other components, steps, operation and/or existence or addition of elements are not excluded in addition to the described components, steps, operation and/or elements unless context dictates otherwise.

Through the whole document, the term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party.

Through the whole document, the term "step of" does not mean "step for".

Through the whole document, the term "combination of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Through this whole specification, a phrase in the form "A and/or B" means "A or B, or A and B".

Hereinafter, embodiments of the present disclosure have been described in detail, but the present disclosure may not be limited thereto.

A first aspect of the present disclosure provides a polyimide precursor compound represented by the following Chemical Formula I:

[Chemical Formula I]

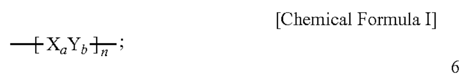

in the above Chemical Formula I, X is a combination of a dianhydride monomer represented by the following Chemical Formula 1 and a diamine monomer represented by the following Chemical Formula 2, Y is a combination of a dianhydride monomer represented by the following Chemical Formula 3 and the diamine monomer represented by the following Chemical Formula 2, a is an integer of 1 to 1,000; b is an integer of 1 to 1,000; n is an integer of 1 to 50,000,

[Chemical Formula 1]

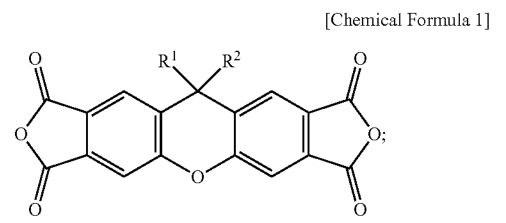

[Chemical Formula 2]

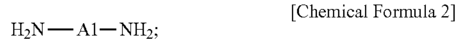

[Chemical Formula 3]

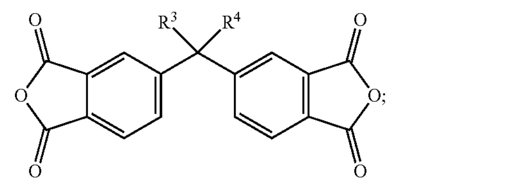

in the above Chemical Formula 1, Chemical Formula 2 and Chemical Formula 3, each of $R^1$ to $R^4$ is independently H, —$CF_3$, a substituted or unsubstituted linear or branched $C_{1-20}$ alkyl group, a substituted or unsubstituted $C_{6-20}$ aryl group, a substituted or unsubstituted $C_{4-20}$ heteroaryl group containing at least one hetero atom(s) from N, O and S, at least one of $R^1$ and $R^2$ is —$CF_3$, or the alkyl group, aryl group or heteroaryl group substituted with —$CF_3$, at least one of $R^3$ and $R^4$ is —$CF_3$, or the alkyl group, aryl group or heteroaryl group substituted with —$CF_3$, A1 is represented by the following Chemical Formula 4 or Chemical Formula 5,

[Chemical Formula 4]

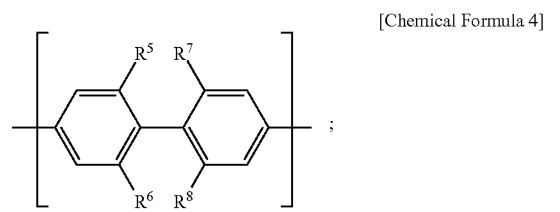

[Chemica Formula 5]

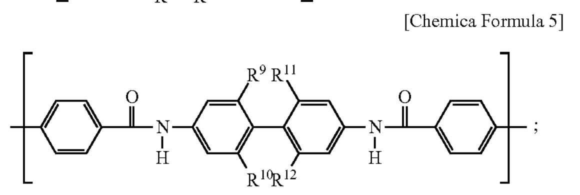

in the above Chemical Formula 4 and Chemical Formula 5, each of $R^5$ to $R^8$ or $R^9$ to $R^{12}$ is independently H, —$CF_3$, a substituted or unsubstituted linear or branched $C_{1-20}$ alkyl group, a substituted or unsubstituted $C_{6-20}$ aryl group, a substituted or unsubstituted $C_{4-20}$ heteroaryl group containing at least one hetero atom(s) from N, O and S, and at least one of $R^5$ to $R^8$, or at least one of $R^9$ to $R^{12}$ is —$CF_3$, or the alkyl group, aryl group or heteroaryl group substituted with —$CF_3$.

In an embodiment of the present disclosure, a diamine monomer included in X of Chemical Formula I may be identical to or different from a diamine monomer included in Y.

In an embodiment of the present disclosure, each of $R^1$ to $R^4$ may be independently selected from H; —$CF_3$, substituted or unsubstituted, methyl group, ethyl group, n-propyl group, iso-propyl group, n-butyl group, iso-butyl group, sec-butyl group, tert-butyl group, n-pentyl group, iso-pentyl group, sec-pentyl group, tert-pentyl group, neo-pentyl group, 3-pentyl group, n-hexyl group, iso-hexyl group, sec-hexyl group, tert-hexyl group, n-heptyl group, iso-heptyl group, sec-heptyl group, tert-heptyl group, n-octyl group, iso-octyl group, sec-octyl group, tert-octyl group, n-nonyl group, iso-nonyl group, sec-nonyl group, tert-nonyl group, n-decyl group, iso-decyl group, sec-decyl group, tert-decyl group, n-undecyl group, iso-undecyl group, sec-undecyl group, tert-undecyl group, n-dodecyl group, iso-dodecyl group, sec-dodecyl group, tert-dodecyl group, n-tridecyl group, iso-tridecyl group, sec-tridecyl group, tert-tridecyl group, n-tetradecyl group, iso-tetradecyl group, sec-tetradecyl group, tert-tetradecyl group, n-pentadecyl group, iso-pentadecyl group, sec-pentadecyl group, tert-pentadecyl group, n-hexadecyl group, iso-hexadecyl group, sec-hexadecyl group, tert-hexadecyl group, n-heptadecyl group, iso-heptadecyl group, sec-heptadecyl group, tert-heptadecyl group, n-octadecyl group, iso-octadecyl group, sec-octadecyl group, tert-octadecyl group, n-nonadecyl group, iso-nonadecyl group, sec-nonadecyl group, tert-nonadecyl group, n-eicosanyl group, iso-eicosanyl group, sec-eicosanyl group, tert-eicosanyl group, phenyl group, biphenyl group, benzyl group, terphenyl group, anthryl group, naphthyl group, naphthyl phenyl group, tolyl group, xylyl group, anthracenyl group, anthracenyl phenyl group, phenanthryl group, phenanthryl phenyl group, pyrenyl group, pyrenyl phenyl group, tetracenyl group, tetracenyl phenyl group, fluoranthenyl group, fluoranthenyl phenyl group, pyridinyl phenyl group, quinolinyl group, quinolinyl phenyl group, acridinyl group, acrydinyl phenyl group, indolyl group, indolyl phenyl group, imidazolyl phenyl group, benzimidazol group, benzimidazolyl phenyl group, thienyl group, and thienyl phenyl group, but may not be limited thereto. In an embodiment of the present disclosure, each of $R^1$ to $R^4$ may be independently H or —$CF_3$.

In an embodiment of the present disclosure, each of $R^5$ to $R^8$, or $R^9$ to $R^{12}$ may be independently selected from H; —$CF_3$; substituted or unsubstituted, methyl group, ethyl group, n-propyl group, iso-propyl group, n-butyl group, iso-butyl group, sec-butyl group, tert-butyl group, n-pentyl group, iso-pentyl group, sec-pentyl group, tert-pentyl group, neo-pentyl group, 3-pentyl group, n-hexyl group, iso-hexyl group, sec-hexyl group, tert-hexyl group, n-heptyl group, iso-heptyl group, sec-heptyl group, tert-heptyl group, n-octyl group, iso-octyl group, sec-octyl group, tert-octyl group, n-nonyl group, iso-nonyl group, sec-nonyl group, tert-nonyl group, n-decyl group, iso-decyl group, sec-decyl group, tert-decyl group, n-undecyl group, iso-undecyl group, sec-undecyl group, tert-undecyl group, n-dodecyl group, iso-dodecyl group, sec-dodecyl group, tert-dodecyl group, n-tridecyl group, iso-tridecyl group, sec-tridecyl group, tert-tridecyl group, n-tetradecyl group, iso-tetradecyl group, sec-tetradecyl group, tert-tetradecyl group, n-pentadecyl group, iso-pentadecyl group, sec-pentadecyl group, tert-pentadecyl group, n-hexadecyl group, iso-hexadecyl group, sec-hexadecyl group, tert-hexadecyl group, n-heptadecyl group, iso-heptadecyl group, sec-heptadecyl group, tert-heptadecyl group, n-octadecyl group, iso-octadecyl group, sec-octadecyl group, tert-octadecyl group, n-nonadecyl group, iso-nonadecyl group, sec-nonadecyl group, tert-nonadecyl group, n-eicosanyl group, iso-eicosanyl group, sec-eicosanyl group, tert-eicosanyl group, phenyl group, biphenyl group, benzyl group, terphenyl group, anthryl group, naphthyl group, naphthyl phenyl group, tolyl group, xylyl group, anthracenyl group, anthracenyl phenyl group, phenanthryl group, phenanthryl phenyl group, pyrenyl group, pyrenyl phenyl group, tetracenyl group, tetracenyl phenyl group, fluoranthenyl group, fluoranthenyl phenyl group, pyridinyl phenyl group, quinolinyl group, quinolinyl phenyl group, acridinyl group, acrydinyl phenyl group, indolyl group, indolyl phenyl group, imidazolyl phenyl group, benzimidazol group, benzimidazolyl phenyl group, thienyl group, and thienyl phenyl group, but may not be limited thereto. In an embodiment of the present disclosure, each of $R^5$ to $R^8$, or $R^9$ to $R^{12}$ may be independently H or —$CF_3$.

In an embodiment of the present disclosure, A1 may be selected from the following Chemical Formula 6, Chemical Formula 7, Chemical Formula 8 and Chemical Formula 9, but may not be limited there to:

[Chemical Formula 6]

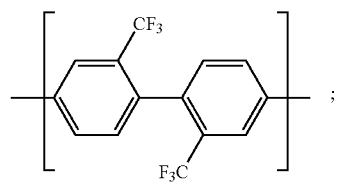

;

[Chemical Formula 7]

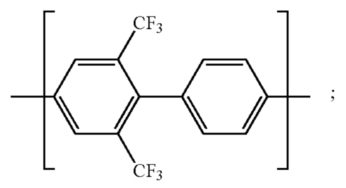

;

[Chemical Formula 8]

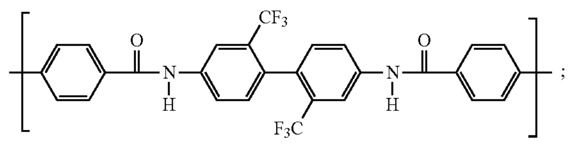

;

[Chemical Formula 9]

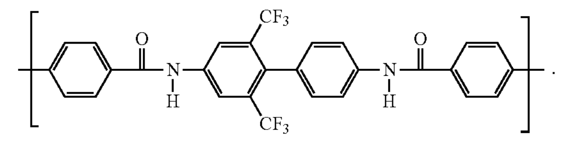

.

In an embodiment of the present disclosure, the polyimide precursor compound may contain polyamic acid represented by the following Chemical Formula 10, but may not be limited thereto:

[Chemical Formula 10]

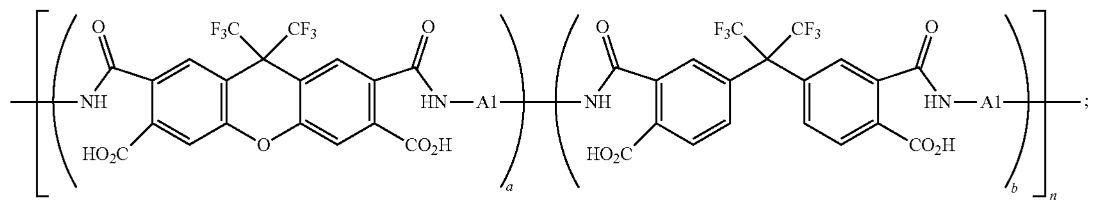

in the above Chemical Formula 10, a is an integer of 1 to 1,000;

b is an integer of 1 to 1,000; and n is an integer of 1 to 50,000.

In an embodiment of the present disclosure, in the above Chemical Formula I, a:b may be from 99:1 to 80:20, but may not be limited there to. Herein, when a:b is 100:0, a yellow index may increase, and when a molar ratio of a is less than 80/100, a coefficient of thermal expansion may increase, but the present disclosure may not be limited thereto.

In an embodiment of the present disclosure, a and b may be controlled by regulating a molar ratio between a dianhydride monomer represented by Chemical Formula 1 and a dianhydride monomer represented by Chemical Formula 2 in Chemical Formula I.

In an embodiment of the present disclosure, a molar ratio between the two types of dianhydride monomers represented by Chemical Formulas 1 and 2 and the diamine monomer represented by Chemical Formula 2 may be from 1.01:1 to 1:1, but may not be limited thereto. In an embodiment of the present disclosure, a reaction is made by adding a greater molar amount of the dianhydride monomers than that of the diamine monomer, and, thus, the thermal stability of thus prepared polyimide can be improved and the yellow index thereof can be reduced.

In an embodiment of the present disclosure, the polyimide precursor compound may be random copolymer.

A second aspect of the present disclosure provides a polyimide, obtained by dehydration of a polyimide precursor according to the first aspect of the present disclosure and represented by the following Chemical Formula II:

[Chemical Formula II]

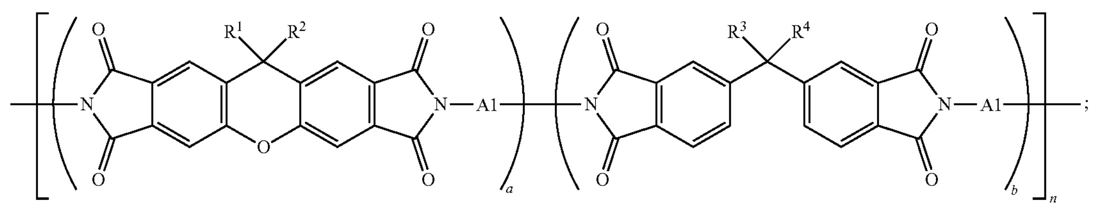

in the above Chemical Formula II, a is an integer of 1 to 1,000;

b is an integer of 1 to 1,000;

n is an integer of 1 to 50,000, each of $R^1$ to $R^4$ is independently H, —$CF_3$, a substituted or unsubstituted linear or branched $C_{1-20}$ alkyl group, a substituted or unsubstituted $C_{6-20}$ aryl group, a substituted or unsubstituted $C_{4-20}$ heteroaryl group containing at least one hetero atom(s) from N, O and S, at least one of $R^1$ and $R^2$ is —$CF_3$, or the alkyl group, aryl group or heteroaryl group substituted with —$CF_3$, at least one of $R^3$ and $R^4$ is —$CF_3$, or the alkyl group, aryl group or heteroaryl group substituted with —$CF_3$, A1 is represented by the following Chemical Formula 4 or Chemical Formula 5,

[Chemical Formula 4]

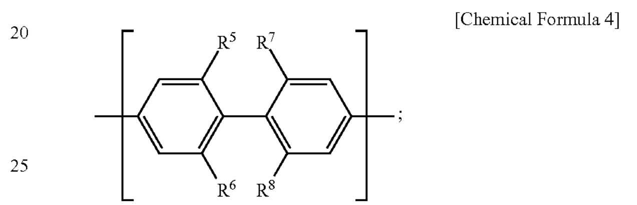

[Chemical Formula 5]

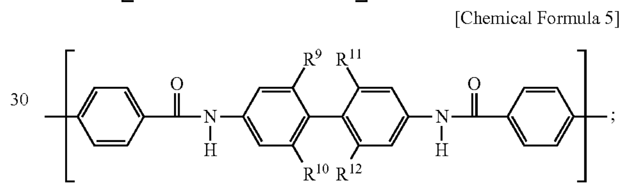

in the above Chemical Formula 4 and Chemical Formula 5, each of $R^5$ to $R^8$ or $R^9$ to $R^{12}$ is independently H, —$CF_3$, a substituted or unsubstituted linear or branched $C_{1-20}$ alkyl group, a substituted or unsubstituted $C_{6-20}$ aryl group, a substituted or unsubstituted $C_{4-20}$ heteroaryl group containing at least one hetero atom(s) from N, O and S, and at least one of $R^5$ to $R^8$, or at least one of $R^9$ to $R^{12}$ is —$CF_3$, or the alkyl group, aryl group or heteroaryl group substituted with —$CF_3$.

Detailed descriptions of the second aspect of the present disclosure, which overlap with those of the first aspect of the present disclosure, are omitted hereinafter, but the descriptions of the first aspect of the present disclosure may be identically applied to the second aspect of the present disclosure, even though they are omitted hereinafter.

In an embodiment of the present disclosure, in the above Chemical Formula II, a:b may be from 99:1 to 80:20, but may not be limited thereto. Herein, when a:b is 100:0, a yellow index may increase, and when a molar ratio of a is less than 80/100, a coefficient of thermal expansion may increase, but the present disclosure may not be limited thereto.

In an embodiment of the present disclosure, the dehydration may be performed through heat treatment, but may not be limited thereto.

In an embodiment of the present disclosure, the polyimide may be random copolymer.

In an embodiment of the present disclosure, a number average molecular weight of the polyimide may be about 10,000 to about 200,000. For example, a number average molecular weight of the polyimide may be about 10,000 to about 200,000, about 10,000 to about 150,000, about 10,000 to about 100,000, about 10,000 to about 70,000, about 10,000 to about 50,000, about 10,000 to about 30,000, about 30,000 to about 200,000, about 30,000 to about 150,000, about 30,000 to about 100,000, about 30,000 to about 70,000, about 30,000 to about 50,000, about 50,000 to about 200,000, about 50,000 to about 150,000, about 50,000 to about 100,000, about 50,000 to about 70,000, about 70,000 to about 200,000, about 70,000 to about 150,000, about 70,000 to about 100,000, about 100,000 to about 200,000, or about 150,000 to about 200,000. In an embodiment of the present disclosure, the preferred number average molecular weight for film formation of the polyimide is about 30,000 to about 70,000, or about 50,000.

A third aspect of the present disclosure provides a film including the polyimide according to the second aspect of the present disclosure.

In an embodiment of the present disclosure, the film may have a glass transition temperature of at least about 400° C. a yellow index of about 6 or less and a coefficient of thermal expansion of about 20 ppm/Ter less, but may not be limited thereto. For example, a yellow index of the film may be about 6 or less, about 5 or less, about 4 to about 6, or about 4 to about 5. For example, a coefficient of thermal expansion of the film may be about 20 ppm/° C. or less, about 1 ppm/° C. to about 20 ppm/° C. or about 3 ppm/° C. to about 20 ppm/° C.

In an embodiment of the present disclosure, the film has flexibility, and the film may be used for a substrate of a display, a cover window, a transparent protective film, a flexible printed circuit board, a buffer coating or an insulating film of an electronic device, but may not be limited thereto.

Hereinafter, the present disclosure will be explained in more detail with reference to Examples. However, the following Examples are illustrative only for better understanding of the present disclosure but do not limit the present disclosure.

MODE FOR CARRYING OUT THE INVENTION

Examples

1. Experiment Design

In an example of the present disclosure, an experiment was performed using a dianhydride monomer (1) represented by the following Chemical Formula 1, a dianhydride monomer 2 represented by the following Chemical Formula (2), and a diamine monomer represented by the following Chemical Formula 3 to prepare a flexible and transparent polyimide film.

[Chemical Formula 1]

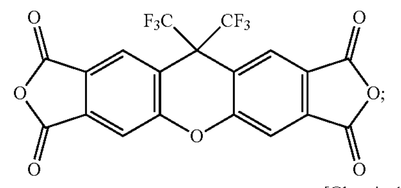

[Chemical Formula 2]

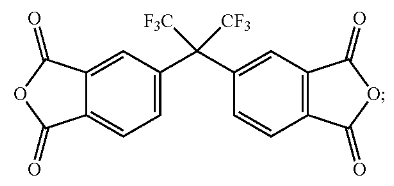

[Chemical Formula 3]

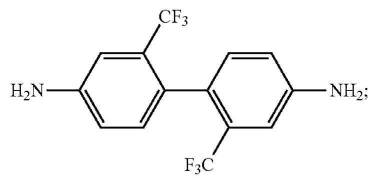

In the example and a comparative example, a molar ratio between the dianhydride monomer (1) and the dianhydride monomer (2) was set differently to perform experiments, and the same type of diamine monomer was used in each experiment.

A molar ratio between the dianhydride monomers (1) and (2) and the diamine monomer (dianhydride monomers (1) and (2):diamine monomer) was set in the range of from 1.01:1 to 1:1 to perform the experiments. Herein, a reaction was made by adding a slightly greater amount of the dianhydride monomers (1) and (2) than that of the diamine monomer to prepare a polyimide film in which browning does not occur even in a high-temperature process.

The following Reaction Formula 1 shows a reaction occurring in the example and the comparative example:

[Reaction Formula 1]

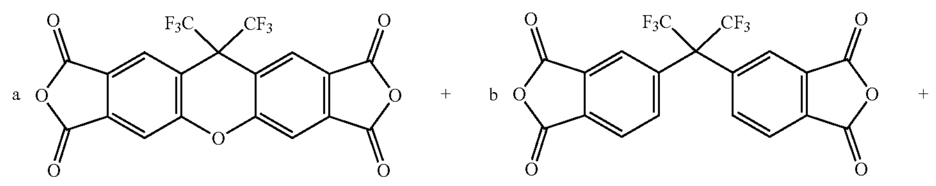

-continued

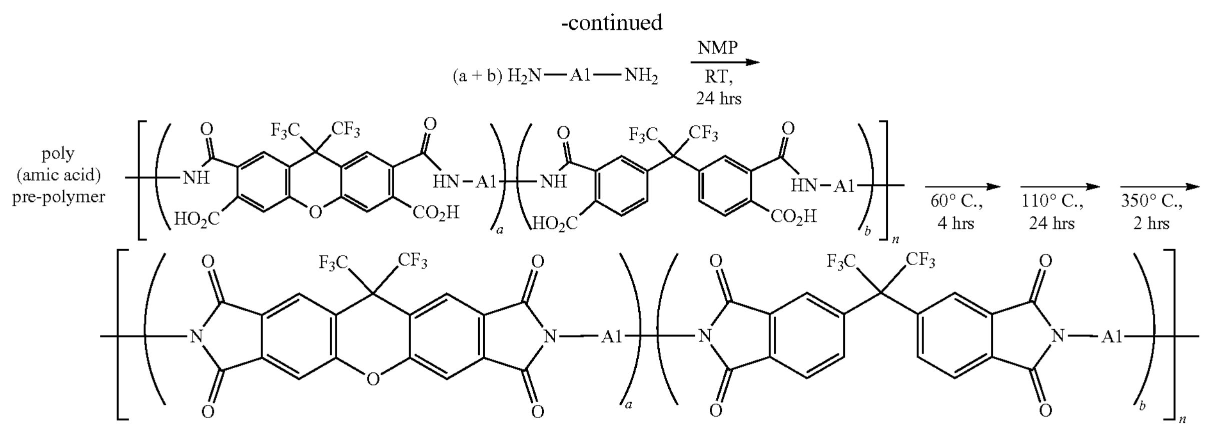

In Reaction Formula 1, RT means that the reaction was carried out at room temperature.

In Reaction Formula 1, the example and the comparative example, a refers to a molar amount of the dianhydride monomer (1) and b refers to a molar amount of the dianhydride monomer (2).

2. Preparation of Polyimide Film According to Example

2.1 Example 1 (a:b=80:20)

8 mmol of dianhydride monomer (1), 2 mmol of dianhydride monomer (2), 10 mmol of diamine monomer and 77.57 mL of N-methyl-2-pyrrolidone(NMP) were added to a 25 mL three-neck round flask to prepare a 10 wt % solution. A nitrogen inlet, an outlet and a mechanical stirrer were connected to the round flask, and the prepared solution was reacted with stirring at room temperature for 24 hours. After completion of the reaction, 0.5 mL of the prepared polyamic acid solution was coated on a glass substrate and then subjected to imidization in a vacuum oven at each of the following conditions: 60° C. for 4 hours; 110° C. for 24 hours; and 350° C. for 2 hours to prepare a polyimide film. FIG. 1 is an image of the polyimide film prepared according to Example 1 of the present disclosure.

2.2 Example 2 (a:b=90:10)

A polyimide film was prepared in the same manner as in Example 1 except that a reaction was made by adding 9 mmol of dianhydride monomer (1), 1 mmol of dianhydride monomer (2) and 77.70 mL of NMP.

2.3 Example 3 (a:b=97.5:2.5)

A polyimide film was prepared in the same manner as in Example 1 except that a reaction was made by adding 9.75 mmol of dianhydride monomer (1), 0.25 mmol of dianhydride monomer (2) and 77.81 mL of NMP.

3. Preparation of Polyimide Film According to Comparative Example

3.1 Comparative Example 1 (a:b=100:0)

A polyimide film was prepared in the same manner as in Example 1 except that a reaction was made by adding 10 mmol of dianhydride monomer (1) and 77.85 mL of NMP.

3.2 Comparative Example 2 (a:b=75:25)

A polyimide film was prepared in the same manner as in Example 1 except that a reaction was made by adding 7.5 mmol of dianhydride monomer (1), 2.5 mmol of dianhydride monomer (2) and 77.5 mL of NMP.

4. Characteristic Evaluation

Cutoff wavelength analysis, transmittance analysis, thermogravimetric analysis, differential scanning calorimetry analysis, thermomechanical analysis, yellow index analysis and dynamic mechanical analysis were performed onto the polyimide films prepared according to Examples 1 to 3 and Comparative Examples 1 and 2, respectively.

(1) Cutoff Wavelength

A wavelength at which transmittance starts to occur was measured from each of the polyimide films prepared according to Examples 1 to 3 and Comparative Examples 1 and 2, respectively.

(2) Transmittance

A transmittance for light with a wavelength of 400 nm and a transmittance for light with a wavelength of 500 nm were measured from each of the polyimide films prepared according to Examples 1 to 3 and Comparative Examples 1 and 2, respectively. A graph of transmittance in the UV-visible region for the polyimide film prepared according to Example 1 is shown in FIG. 2.

(3) Thermogravimetric Analysis

A temperature at which each of the polyimide films prepared according to Examples 1 to 3 and Comparative Examples 1 and 2, respectively, decreases in weight by 5% was measured from each of the polyimide films prepared according to Examples 1 to 3 and Comparative Examples 1 and 2, respectively, while temperature was increased by 5° C./min with a thermogravimetric analyzer. A graph of thermogravimetric analysis in air for the polyimide film prepared according to Example 1 is shown in FIG. 3.

(4) Differential Scanning Calorimetry Analysis

A glass transition temperature $T_g$ of each of the polyimide films prepared according to Examples 1 to 3 and Comparative Examples 1 and 2, respectively, was calculated from the second heat flux depending on temperature while temperature was increased by 5° C./min under a nitrogen atmosphere. A graph of differential scanning calorimetry analysis of the polyimide film prepared according to Example 1 is shown in FIG. 4.

(5) Thermomechanical Analysis

A coefficient of thermal expansion(CTE) of each of the polyimide films prepared according to Examples 1 to 3 and Comparative Examples 1 and 2, respectively, was measured by measuring changes in volume of each of the polyimide films while temperature was increased by 5° C./min under a nitrogen atmosphere. When the coefficient of thermal expansion of the film is higher than 20 ppm/° C., defects such as cracks or bending may occur in the film. A graph of thermomechanical analysis of the polyimide film prepared according to Example 1 is shown in FIG. 5.

(6) A Yellow Index

A yellow index was calculated by using the measured transmittance values of each of the polyimide films prepared according to Examples 1 to 3 and Comparative Examples 1 and 2, respectively. When the yellow index is higher than 6, the polyimide film cannot be used as a transparent film.

(7) Dynamic Mechanical Analysis (DMA)

An alpha transition temperature of each of the polyimide films prepared according to Examples 1 and 2, respectively, was measured by measuring changes in modulus of each of the polyimide films while temperature was increased by 5° C./min at a temperature of from room temperature to 450° C. under a load of 0.01 N. A graph of dynamic mechanical analysis of the polyimide film prepared according to Example 1 is shown in FIG. 6.

The following Table 1 shows characteristic evaluation results of the polyimide films prepared according to Examples 1 to 3 and Comparative Examples 1 and 2, respectively.

TABLE 1

| | | | | $T_{d5}$ (° C.) | | | CTE (ppm/° C.) | | | Alpha transition |
|---|---|---|---|---|---|---|---|---|---|---|
| | $\lambda^0$ (nm) | $T_{400\ nm}$ (%) | $T_{550\ nm}$ (%) | Nitrogen atmosphere | Air atmosphere | $T_g$ (° C.) | Second analysis | Third analysis | Yellow index | temperature (° C.) |
| Example 1 | 349 | 80.1 | 89.3 | 494.3 | 478.2 | >400 | 17.2 | 16.9 | 4.03 | 420 |
| Example 2 | 349 | 77.9 | 88.4 | 490.7 | 470.3 | >400 | 9.4 | 9.3 | 4.47 | 420 |
| Example 3 | 351 | 77.9 | 88.5 | 492.3 | 472.4 | >400 | 3.4 | 3.2 | 4.24 | — |
| Comparative example 1 | 351 | 73.9 | 88.6 | 513.8 | 478.4 | >400 | 1.9 | 1.5 | 6.96 | — |
| Comparative example 2 | 349 | 80.1 | 88.9 | 494.2 | 471.4 | >400 | 25.1 | 24.8 | 3.68 | — |

$\lambda^0$: Wavelength at which the film starts to exhibit transmittance
$T_{400\ nm}$: Transmittance of the film at 400 nm
$T_{550\ nm}$: Transmittance of the film at 550 nm
$T_{d5}$: Temperature at which the film decreases in weight by 5% as a result of thermogravimetric analysis
$T_g$: Glass transition temperature
CTE: Coefficient of thermal expansion 5. Conclusion The polyimide films prepared according to Examples 1 to 3 have a yellow index of 6 or less, a glass transition temperature of at least 400° C. and a coefficient of thermal expansion of 200 ppm/° C. or less, which confirms that they can be used as flexible and transparent polyimide films.

However, when the experiment was performed without using the dianhydride monomer (2) as in Comparative Example 1, the resultant film has a yellow index of more than 6 and thus cannot be used as a material of a transparent display. Also, when the experiment was performed by setting a ratio between the dianhydride monomer (1) and the dianhydride monomer (2) to 75:25 as in Comparative Example 2, the resultant film has a coefficient of thermal expansion of more than 20 ppm/° C. and thus may be subjected to defects.

According to the examples described above, it was confirmed that an appropriate molar ratio between the dianhydride monomer (1) and the dianhydride monomer (2) for the preparation of a flexible and transparent polyimide film is from 99:1 to 80:20.

The above description of the present disclosure is provided for the purpose of illustration, and it would be understood by a person with ordinary skill in the art that various changes and modifications may be made without changing technical conception and essential features of the present disclosure. Thus, it is clear that the above-described examples are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A polyimide precursor compound represented by the following Chemical Formula I:

[Chemical Formula I]

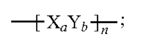

wherein, in the above Chemical Formula I:

X is a combination of a dianhydride monomer represented by the following Chemical Formula 1 and a diamine monomer represented by the following Chemical Formula 2, Y is a combination of a dianhydride monomer represented by the following Chemical Formula 3 and the diamine monomer represented by the following Chemical Formula 2, a is an integer of 1 to 1,000, b is an integer of 1 to 1,000, n is an integer of 1 to 50,000, a:b is 80:20 or 97.5:2.5, and

[Chemical Formula 1]

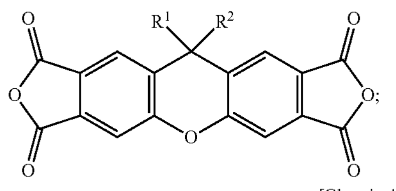

[Chemical Formula 2]

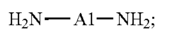

[Chemical Formula 3]

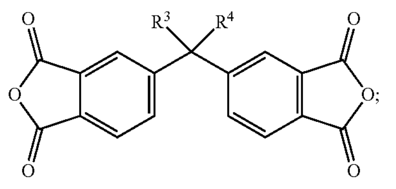

wherein, in the above Chemical Formula 1, Chemical Formula 2 and Chemical Formula 3:

each of $R^1$ to $R^4$ is independently H, —$CF_3$, a substituted or unsubstituted linear or branched $C_{1-20}$ alkyl group, a substituted or unsubstituted $C_{6-20}$ aryl group, or a substituted or unsubstituted $C_{4-20}$ heteroaryl group containing at least one hetero atom(s) from N, O, or S, at least one of $R^1$ and $R^2$ is —$CF_3$, the alkyl group, aryl group, or heteroaryl group substituted with —$CF_3$, at least one of $R^3$ and $R^4$ is —$CF_3$, the alkyl group, aryl group, or heteroaryl group substituted with —$CF_3$, and A1 is represented by the following Chemical Formula 4 or Chemical Formula 5:

[Chemical Formula 4]

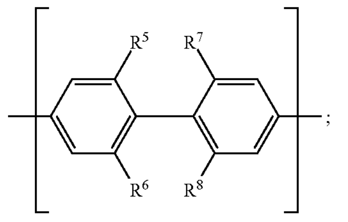

[Chemical Formula 5]

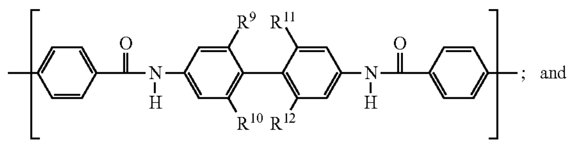

wherein, in the above Chemical Formula 4 and Chemical Formula 5:

each of $R^5$ to $R^8$ or $R^9$ to $R^{12}$ is independently H, —$CF_3$, a substituted or unsubstituted linear or branched $C_{1-20}$ alkyl group, a substituted or unsubstituted $C_{6-20}$ aryl group, or a substituted or unsubstituted $C_{4-20}$ heteroaryl group containing at least one hetero atom(s) from N, O, or S, and at least one of $R^5$ to $R^8$, or at least one of $R^9$ to $R^{12}$ is —$CF_3$, the alkyl group, aryl group, or heteroaryl group substituted with —$CF_3$.

2. The polyimide precursor compound of claim 1, wherein each of $R^1$ to $R^4$ is independently selected from the group consisting of H; —$CF_3$; substituted or unsubstituted, methyl group, ethyl group, n-propyl group, iso-propyl group, n-butyl group, iso-butyl group, sec-butyl group, tert-butyl group, n-pentyl group, iso-pentyl group, sec-pentyl group, tert-pentyl group, neo-pentyl group, 3-pentyl group, n-hexyl group, iso-hexyl group, sec-hexyl group, tert-hexyl group, n-heptyl group, iso-heptyl group, sec-heptyl group, tert-heptyl group, n-octyl group, iso-octyl group, sec-octyl group, tert-octyl group, n-nonyl group, iso-nonyl group, sec-nonyl group, tert-nonyl group, n-decyl group, iso-decyl group, sec-decyl group, tert-decyl group, n-undecyl group, iso-undecyl group, sec-undecyl group, tert-undecyl group, n-dodecyl group, iso-dodecyl group, sec-dodecyl group, tert-dodecyl group, n-tridecyl group, iso-tridecyl group, sec-tridecyl group, tert-tridecyl group, n-tetradecyl group, iso-tetradecyl group, sec-tetradecyl group, tert-tetradecyl group, n-pentadecyl group, iso-pentadecyl group, sec-pentadecyl group, tert-pentadecyl group, n-hexadecyl group, iso-hexadecyl group, sec-hexadecyl group, tert-hexadecyl group, n-heptadecyl group, iso-heptadecyl group, sec-heptadecyl group, tert-heptadecyl group, n-octadecyl group, iso-octadecyl group, sec-octadecyl group, tert-octadecyl group, n-nonadecyl group, iso-nonadecyl group, sec-nonadecyl group, tert-nonadecyl group, n-eicosanyl group, iso-eicosanyl group, sec-eicosanyl group, tert-eicosanyl group, phenyl group, biphenyl group, benzyl group, terphenyl group, anthryl group, naphthyl group, naphthyl phenyl group, tolyl group, xylyl group, anthracenyl group, anthracenyl phenyl group, phenanthryl group, phenanthryl phenyl group, pyrenyl group, pyrenyl phenyl group, tetracenyl group, tetracenyl phenyl group, fluoranthenyl group, fluoranthenyl phenyl group, pyridinyl phenyl group, quinolinyl group, quinolinyl phenyl group, acridinyl group, acrydinyl phenyl group, indolyl group, indolyl phenyl group, imidazolyl phenyl group, benzimidazol group, benzimidazolyl phenyl group, thienyl group, and thienyl phenyl group.

3. The polyimide precursor compound of claim 1, wherein each of $R^5$ to $R^8$, or $R^9$ to $R^{12}$ is independently selected from the group consisting of H; —$CF_3$; substituted or unsubstituted, methyl group, ethyl group, n-propyl group, iso-propyl group, n-butyl group, iso-butyl group, sec-butyl group, tert-butyl group, n-pentyl group, iso-pentyl group, sec-pentyl group, tert-pentyl group, neo-pentyl group, 3-pentyl group, n-hexyl group, iso-hexyl group, sec-hexyl group, tert-hexyl group, n-heptyl group, iso-heptyl group, sec-heptyl group, tert-heptyl group, n-octyl group, iso-octyl group, sec-octyl group, tert-octyl group, n-nonyl group, iso-nonyl group, sec-nonyl group, tert-nonyl group, n-decyl group, iso-decyl group, sec-decyl group, tert-decyl group, n-undecyl group, iso-undecyl group, sec-undecyl group, tert-undecyl group, n-dodecyl group, iso-dodecyl group, sec-dodecyl group, tert-dodecyl group, n-tridecyl group, iso-tridecyl group, sec-tridecyl group, tert-tridecyl group, n-tetradecyl group, iso-tetradecyl group, sec-tetradecyl group, tert-tetradecyl group, n-pentadecyl group, iso-pentadecyl group, sec-pentadecyl group, tert-pentadecyl group, n-hexadecyl group, iso-hexadecyl group, sec-hexadecyl group, tert-hexadecyl group, n-heptadecyl group, iso-heptadecyl group, sec-heptadecyl group, tert-heptadecyl group, n-octadecyl group, iso-octadecyl group, sec-octadecyl group, tert-octadecyl group, n-nonadecyl group, iso-nonadecyl group, sec-nonadecyl group, tert-nonadecyl group, n-eicosanyl group, iso-eicosanyl group, sec-eicosanyl group, tert-eicosanyl group, phenyl group, biphenyl group, benzyl group, terphenyl group, anthryl group, naphthyl group, naphthyl phenyl group, tolyl group, xylyl group, anthracenyl group, anthracenyl phenyl group, phenanthryl group, phenanthryl phenyl group, pyrenyl group, pyrenyl phenyl group, tetracenyl group, tetracenyl phenyl group, fluoranthenyl group, fluoranthenyl phenyl group, pyridinyl phenyl group, quinolinyl group, quinolinyl phenyl group, acridinyl group, acrydinyl phenyl group, indolyl group, indolyl phenyl group, imidazolyl phenyl group, benzimidazol group, benzimidazolyl phenyl group, thienyl group, and thienyl phenyl group.

4. The polyimide precursor compound of claim 1, wherein A1 is selected from the group consisting of the following Chemical Formula 6, Chemical Formula 7, Chemical Formula 8, and Chemical Formula 9:

[Chemical Formula 6]

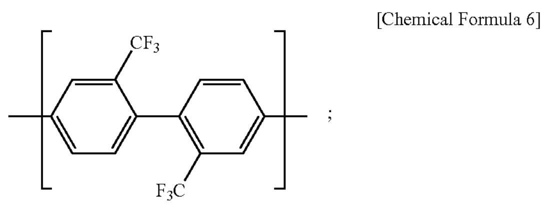

;

-continued

[Chemical Formula 7]

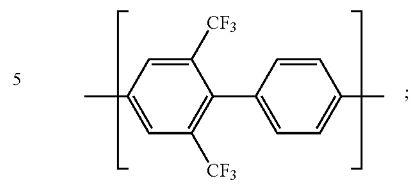

;

[Chemical Formula 8]

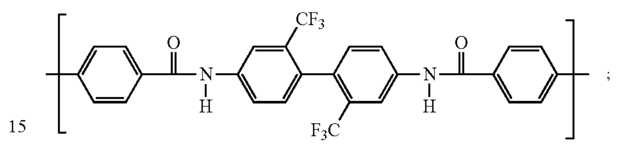

;

[Chemical Formula 9]

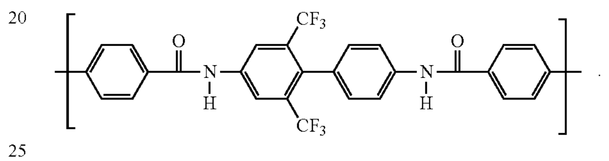

.

5. The polyimide precursor compound of claim 1, wherein the polyimide precursor compound contains polyamic acid represented by the following Chemical Formula 10:

[Chemical Formula 10]

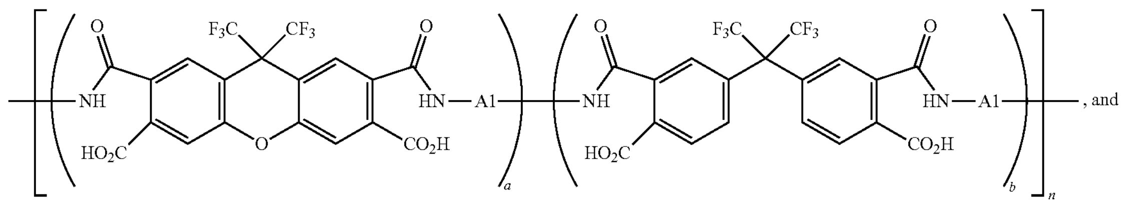

, and wherein, in the above Chemical Formula 10;

a is an integer of 1 to 1,000;

b is an integer of 1 to 1,000;

n is an integer of 1 to 50,000; and a:b is 80:20, or 97.5:2.5.

6. A Polyimide, obtained by dehydration of a polyimide precursor of claim 1 and represented by the following Chemical Formula II:

[Chemical Formula II]

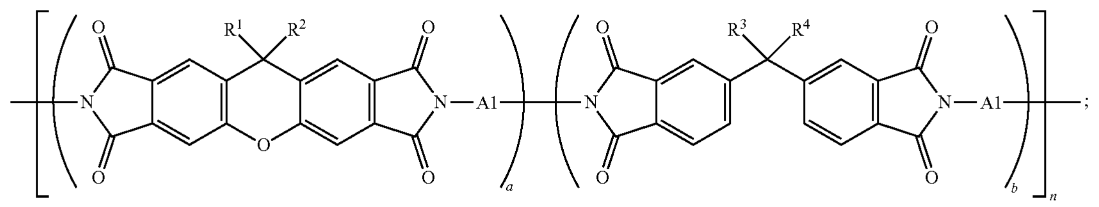

;

wherein, in the above Chemical Formula II:

a is an integer of 1 to 1,000, b is an integer of 1 to 1,000, n is an integer of 1 to 50,000, a:b is 80:20 or 97.5:2.5, each of $R^1$ to $R^4$ is independently H, —$CF_3$, a substituted or unsubstituted linear or branched $C_{1-20}$ alkyl group, a substituted or unsubstituted $C_{6-20}$ aryl group, or a substituted or unsubstituted $C_{4-20}$ heteroaryl group containing at least one hetero atom(s) from N, O, or S, at least one of $R^1$ and $R^2$ is —$CF_3$, the alkyl group, aryl group, or heteroaryl group substituted with —$CF_3$, at least one of $R^3$ and $R^4$ is —$CF_3$, the alkyl group, aryl group, or heteroaryl group substituted with —$CF_3$, and A1 is represented by the following Chemical Formula 4 or Chemical Formula 5,

[Chemical Formula 4]

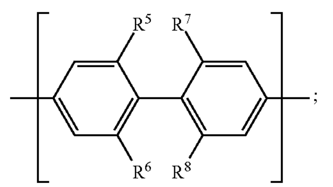

;

[Chemical Formula 5]

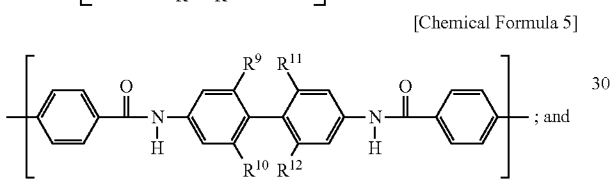

; and wherein, in the above Chemical Formula 4 and Chemical Formula 5, each of $R^5$ to $R^8$ or $R^9$ to $R^{12}$ is independently H, —$CF_3$, a substituted or unsubstituted linear or branched $C_{1-20}$ alkyl group, a substituted or unsubstituted $C_{6-20}$ aryl group, or a substituted or unsubstituted $C_{4-20}$ heteroaryl group containing at least one hetero atom(s) from N, O, or S, and at least one of $R^5$ to $R^8$, or at least one of $R^9$ to $R^{12}$ is —$CF_3$, the alkyl group, aryl group, or heteroaryl group substituted with —$CF_3$.

7. The polyimide of claim 6, wherein the dehydration is performed through heat treatment.

8. A film, comprising a polyimide of claim 6.

9. The film of claim 8, wherein the film has a glass transition temperature of at least 400° C., a yellow index of 6 or less and a coefficient of thermal expansion of 20 ppm/° C. or less.

10. The film of claim 8, wherein the film has flexibility, and wherein the film is used for a substrate of a display, a cover window, a transparent protective film, a flexible printed circuit board, a buffer coating, or an insulating film of an electronic device.

* * * * *